Oct. 20, 1925.
T. H. BANE
1,557,789
HELICOPTER AIRPLANE
Filed April 30, 1923     5 Sheets-Sheet 4
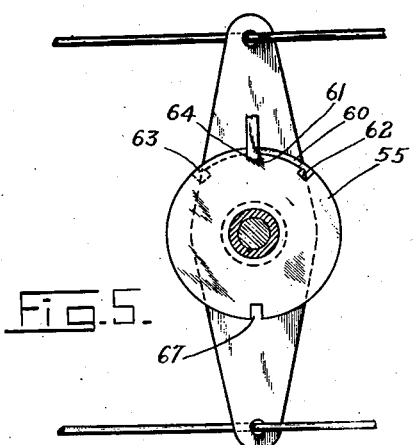
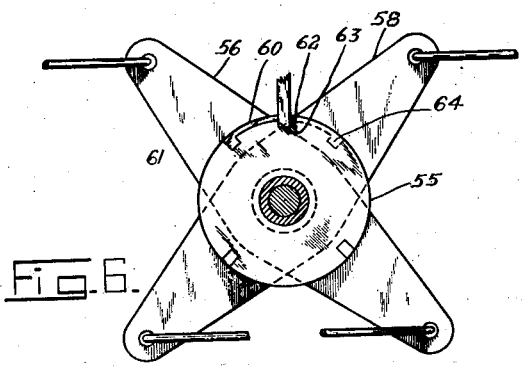
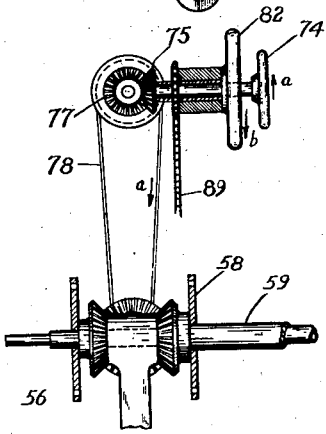
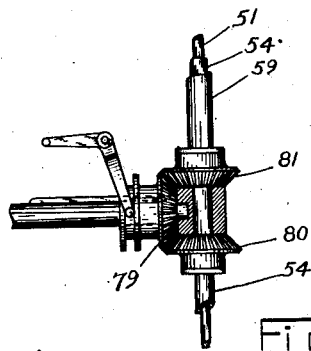
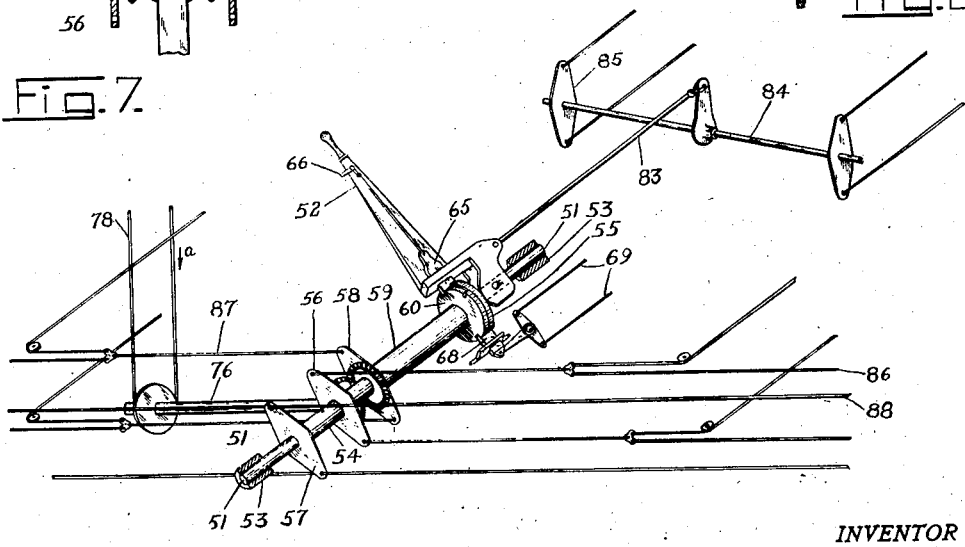
INVENTOR
THURMAN H. BANE
BY Robert H. Young
ATTORNEY

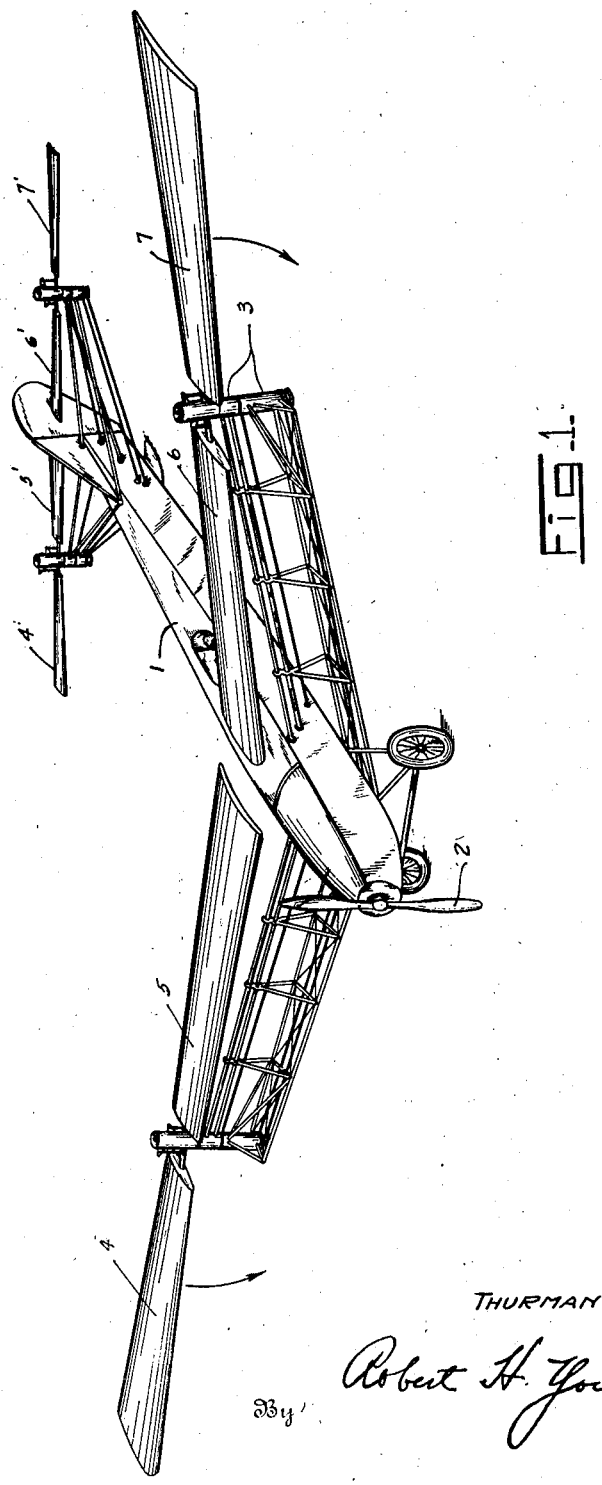

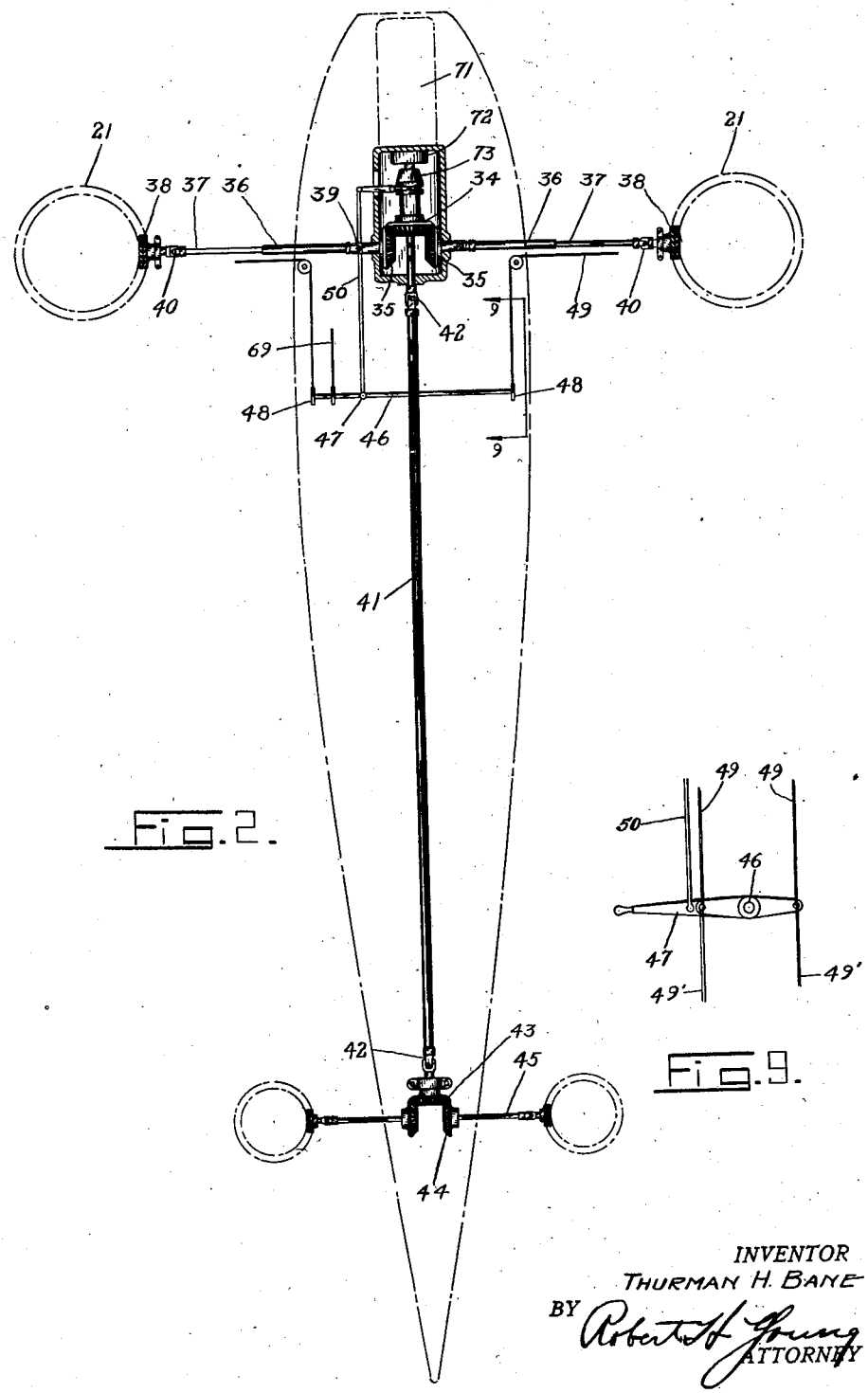

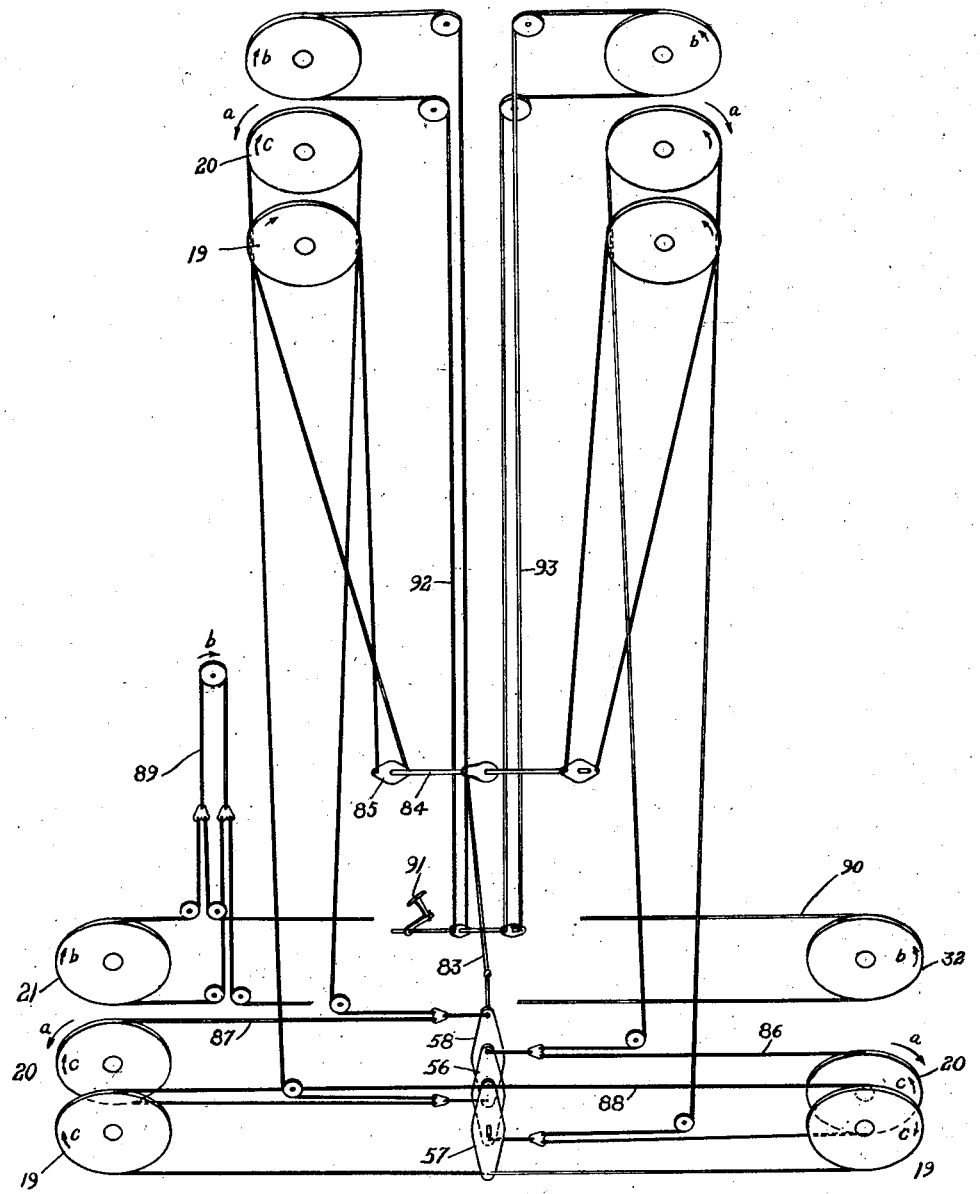

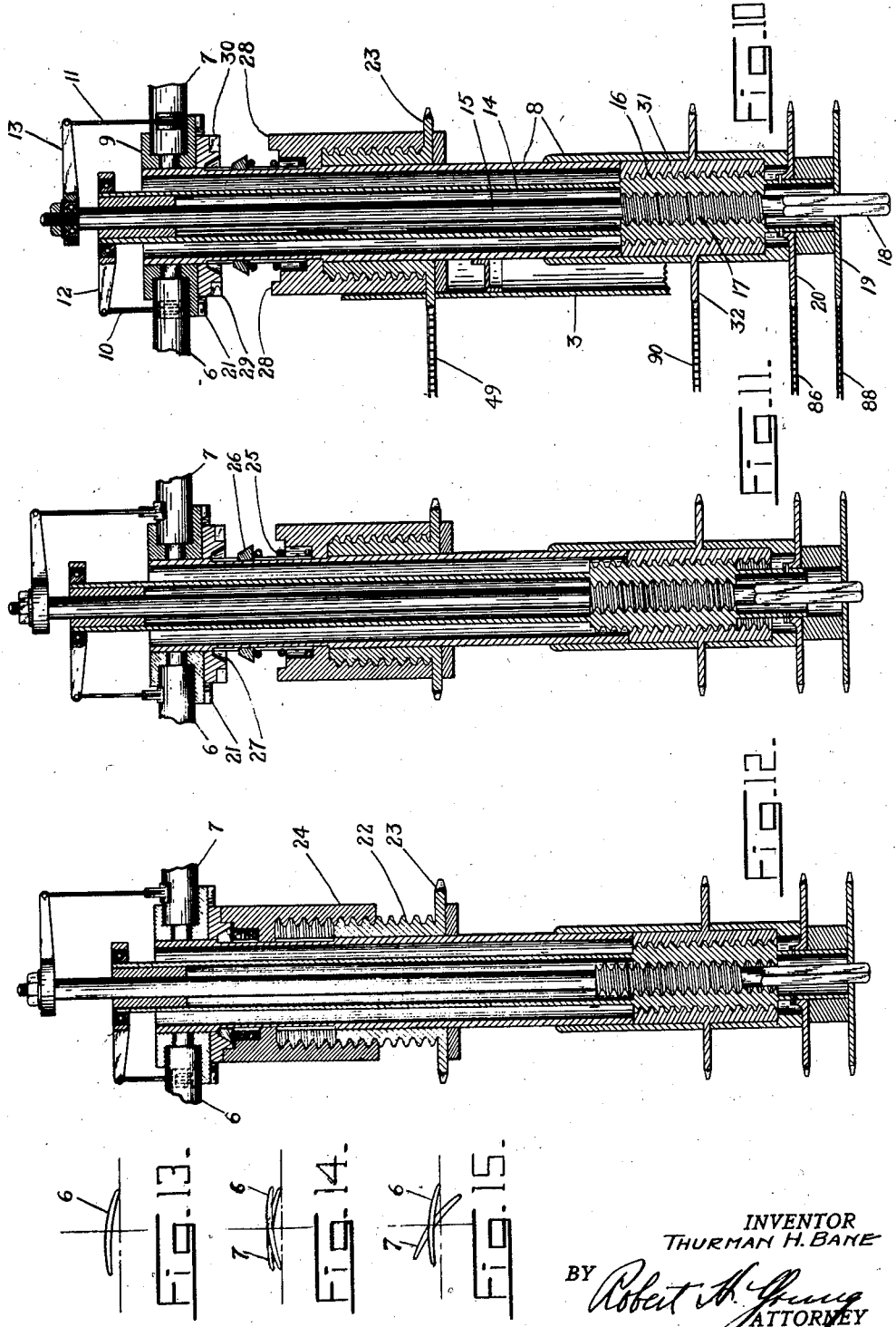

Patented Oct. 20, 1925.

1,557,789

UNITED STATES PATENT OFFICE.

THURMAN H. BANE, OF DAYTON, OHIO.

HELICOPTER AIRPLANE.

Application filed April 30, 1923. Serial No. 635,749.

*To all whom it may concern:*

Be it known that I, THURMAN H. BANE, a citizen of the United States, residing at 411 West First Street, Dayton, in the county of Montgomery and State of Ohio, have invented certain new and useful Improvements in Helicopter Airplanes, of which the following is a specification.

The invention relates in general to heavier-than-air flying machines and more particularly to a machine of this nature which will be capable of operation as an airplane or as a helicopter.

While a flying machine of the known helicopter type has the advantage of being able to rise vertically from the ground and descend vertically, serious difficulties may be met in obtaining the high horizontal speed necessary to secure broad use of the helicopter as a vehicle of locomotion. The airplane is capable of developing, with efficiency, very high horizontal speeds, but has the disadvantage of having a very high starting and landing speed. It is therefore the main object of this invention to unite together the advantages of both types of machine by an adaption of the airplane for vertical flight. To this end the wings and horizontal stabilizers of the airplane are used as lifting propellers as well as for their respective functions.

I have chosen to show a monoplane in illustrating my invention, but in its broader scope the invention may be considered as an ordinary airplane of any type in which the wings are replaced by lifting propellers of peculiar design, fixed to the fuselage by suitable out-riggers, the tail planes, or horizontal stabilizers, of the plane being replaced by smaller lifting propellers after the same manner. The motor and horizontal propelling means are disposed at the front of the fuselage as usual, suitable transmission gearing and clutches controlling the operation of the tractor propeller and the lifting propellers.

In changing the machine from a helicopter to an airplane, means are provided whereby the blades of the main lifting propellers may be utilized as lifting surfaces for horizontal flight and the blades of the auxiliary tail lifting propellers for horizontal fins or stabilizers.

It is further contemplated to make the tractor propeller adjustable, as for instance is the one shown in Patent #1,403,775, January 17, 1922, so that the pitch may be set to the angle of no thrust while the machine is operating as a helicopter and the pitch gradually increased to the maximum as the machine is being changed from a helicopter to an airplane.

A further object of my invention is to provide means whereby the pitch angle of the lifting means may be differentially varied as between opposing screws to control lateral stability of the machine when operating as a helicopter and means whereby such means may be rendered inoperative at will.

Another object is to provide means whereby the pitch angle of one of the blades of each lifting means may be relatively varied in a manner to control lateral stability of the craft when operating as an airplane and means whereby such means are rendered inoperative at will.

Another object is to provide means for initially positioning the blades of the lifting screws to any desirable angle of attack in all cases when operating as a helicopter and means whereby such means may be rendered inoperative at will.

It is a further object of the invention to simplify and combine certain of the control means for accomplishing the objects set forth above.

With the foregoing and other objects in view, which will more fully appear as the description of the preferred embodiment of my invention proceeds, the invention resides in the combination of parts and details hereinafter claimed.

Referring to the drawings:—

Fig. 1 is a view in perspective of the helicopter airplane showing the aircraft in its transformed arrangement as an airplane.

Fig. 2 is a plan view illustrating the method of driving the lifting propellers.

Fig. 3 is a diagrammatic sketch showing the arrangement of cable controls for the front and rear blades.

Fig. 4 is a perspective view of the control stick and the cable connections controlling the blades.

Figs. 5 and 6 are detail views of cable operating arms.

Figs. 7 and 8 are detail views of the hand wheel control for changing the pitch of the blades simultaneously during vertical ascent.

Fig. 9 is a side elevation of the engine clutch control lever.

Figs. 10, 11 and 12 are detail sectional views of the blade tilting mechanism on the left hand side of the fuselage; Fig. 10 showing both blades at an appreciable angle of incidence for forward flight; Fig. 11 showing the blades adjusted for unequal angles of incidence, and Fig. 12 showing one blade tilted for lateral stabilization.

Fig. 13 is a diagrammatic view corresponding to Fig. 10 showing both blades at a normal planing angle.

Fig. 14 is a detail view showing the blades as a helicopter.

Fig. 15 is a diagrammatic view corresponding to Fig. 12 showing the relative position of the blades while stabilizing.

In the drawings in which similar reference numerals designate corresponding parts, 1 designates the fuselage at the front of which is a tractor propeller 2 which is of the well known variable pitch type. At each side of the fuselage is a suitable supporting truss upon which are mounted the housings 3 which enclose the lifting propeller support and operating mechanism for the main lifting and supporting blades 4, 5, 6 and 7. These propeller blades are of considerable length and width as shown and are adapted to rotate around vertical axes to provide a lifting means for the helicopter aircraft while ascending. After the machine has ascended to the desired height the front tractor propeller is adjusted to drive the machine forward and the blades of the lifting propeller stopped and held stationary. The angle of incidence is adjusted so that the blades will function as ordinary lifting planes and support the machine in its forward flight.

The means for driving and operating the blades 6, 7 on the left side of the aircraft are shown in Figs. 10, 11 and 12 in which 8 designates the fixed supporting shell; suitably mounted in the casings 3. At its upper end the shell 8 freely carries the rotatable support 9 in which are revolubly mounted the blades 6 and 7. The blades are adjusted and held at the desired angle of incidence by links 10, 11 which are pivotally attached to the blades at one end and at the other end are suitably fastened to arms 12, 13. These arms rotate with the propeller blades, suitable ball bearings being provided between the arms and the rods 14, 15. It will be seen that as the rods 14, 15 are raised or lowered, the pitch of the blades 6, 7 will be adjusted while permitting the free rotation of the blades. Near the lower end of the rod 14 is a male screw thread 16 engaging a similar female thread in a part 31 which is rotatably mounted within the shell 8, being rotated by a sprocket 32 which also prevents endwise movement of the sleeve 31.

The rod 15 is provided with a thread 17 engaging a female thread in member 14. The lower end of rod 15 is provided with a square shank 18 adapted for sliding in a square hole in sprocket 19 so that as sprocket 19 is rotated the rod 15 is turned and screw thread 17 causes it to move upward to raise the arm 13 so as to tilt the blade 7. Sprocket 20 which is slidably mounted on rod 14 but which rotates therewith by means of a suitable pin and slot arrangement is adapted to rotate rod 14 to change the angle of attack of the blade 6.

The propeller is rotated by gear 21 which is driven by the motor as will be later set forth. Rotatably mounted on shell 8 is a threaded member 22 rotated by sprocket 23 for vertically moving the member 24 which is keyed to shell 8 so that it can slide vertically thereon. As the member 24 is moved vertically the clutch face 26 which is also keyed to shell 8 is forced up by the spring 25, to engage with clutch face which rotates with gear 21 and propeller support 9. A braking effect is thus produced tending to stop the rotation of the propeller blades, and if the motor has been disconnected the propeller will be slowed down, permitting the projections 28 to enter the corresponding depressions 29, 30 in the upper clutch member to stop the rotation of the propeller and hold it in the position as shown in Figure 1. The projections 28 are of different shapes so that the propeller when locked is always in the same position.

At the rear of the machine are provided two smaller lifting propellers having blades 4', 5', 6', and 7', the propellers being mounted one at each side of the fuselage upon a suitable supporting truss. It will be understood that the means for supporting, driving and operating the two front and the two rear propellers are similar, but the propeller on the right side of the airplane, both front and rear, are provided with rods similar to rods 14 and 15 but which are provided with left-hand threads instead of the right-hand threads 16 and 17. In every case the center rod as rod 15, is connected to the outside blade 4, 7, 4', 7' when the blades are in their planing or stationary position, and is connected to a point ahead of the pivotal axes of the blade.

As shown in Fig. 2 the motor 71 is connected through suitable clutch members 72, 73, to bevel gear 34 driving gears 35, connected to driving shaft 36, in which are splined shafts 37 which drive gears 38 at their outer ends. Suitable universal joints 39 and 40 are provided to care for any flexing which may be caused by the upward pull at the outer ends due to the propeller lift. Each gear 38 is adapted to engage and drive the corresponding gear 21 of the propellers. The bevel gear 34 also drives the rear propellers through shaft 41, universal joints 42, gear 43, gears 44 and shafts 45.

Mounted transversely of the fuselage in suitable bearings is a shaft 46 operated by hand lever 47 and provided with operating levers 48 at each end, which are connected to the corresponding sprockets 23 by wires 49 and suitable sprocket chains. Connected to lever 47 is rod 50 which operates the clutch 72, 73, to disconnect same when the lever 47 is pushed forward, the movement of the lever 47 at the same time turning the sprocket 23 so as to lock the propellers. The sprockets 23 of the rear propellers are operated simultaneously with sprocket 23 of the front propellers by cables 49′ extending rearwardly from levers 48.

Mounted for fore and aft pivotal movement on a longitudinal shaft 51 is a hand lever 52, and shaft 51 is mounted for rotational movement on bearings 53. Rotatably mounted on shaft 51 is a second shaft 54, which is connected to a disk 55 at the rear end of the same. On shaft 54 is a double ended lever 56. A second lever 57 is fixed on shaft 51. A third lever 58 is fixed on a shaft 59 which surrounds and is rotatable on shaft 54 and which is provided with disk 60 adjacent to disk 55. Disk 55 is provided with notches 61 and 62 and disk 60 with notches 63 and 64. When the blades are in their stationary planing position, notches 61 and 64 are engaged by a latch 65 as shown in Fig. 5. Latch 65 is adapted to be withdrawn by handle 66 in order to permit lever 52 to move laterally to operate lever 57 alone for stabilizing action as will be hereinafter described. Notches 67 in the lower part of disks 55 and 60 are engaged when the aircraft is flying as an airplane by a latch 68 operated by cables 69 which are connected to a lever on shaft 46 so that the latch 68 is engaged when the rotation of the lifting blades is stopped; and disengaged when flying as a helicopter to permit relative movement of the disks for changes in pitch of the lifting blades.

Hand wheel 74 is provided with a gear 75 which rotates shaft 76 through gear 77 and cables 78. Rotation of shaft 76 moves levers 56 and 58 in reverse directions when the gear 79 is moved into engagement with gears 80, 81 by a suitable foot operated lever as shown in Fig. 8. The gear 79 is normally disengaged except when it is desired to manipulate hand wheel 74 to change the pitch of the inside blades so as to adjust the blades to act as helicopters. A second hand wheel 82 is concentrically mounted with hand wheel 74 and operates sprockets 32 as later described.

Hand lever 52 is adapted to operate the rear sprockets 19 through rod 83, shaft 84 and levers 85, upon fore and aft movements of the hand lever. It will be noted that the hand lever may operate levers 85 without being disengaged from disks 55 and 60 by pawl 68. The operation of the device is as follows:

When it is desired to ascend vertically from the ground the motor is set in operation and the joy stick 52 examined to see that locking pin 65 is in place as shown in Figs. 4 and 5. At this time the controls are positioned as shown in Figs. 3, 4, 5, 10 and 13 with the lifting blades all at a positive angle of incidence to forward flight, the joy stick 52 being in an upright position.

The forward propeller 2 is rotating at a slow speed with the blades at a neutral or no thrust position. The lever 47 is now operated to release the brake clutch 26 and permit the propellers to rotate; also to disengage locking pin 68 and finally to connect the motor to the several drive shafts 36, 41 and 45 to start the blades rotating. The pitch of blades 5, 6, 5′, 6′ is now reversed so that an upward force will be exerted by all the lifting blades. This is done by a clockwise rotation of hand wheel 74, the clutch gear 79 being just thrown into engagement, which moves levers 56 and 58 to the position shown in Fig. 6. In order to permit rotation of wheel 74 it is first necessary to release the latch 65 by lever 66, and after the adjustment is made the latch is again engaged.

It will be seen that the described movement of wheel 74 rotates the sprockets 20 on all the lifting units in the direction of the arrows a, through the cables 86 and 87. Sprocket 20 will rotate rods 16 and raise the rear edges of blades 6 and 6′ on the left side of the airplane. The threads on the rods 14 and 15 of the units on the right side of the airplane being left handed and the sprockets on that side being rotated oppositely from those on the left, the rear edge of blades 5 and 5′ is also raised. The rod 15 will not move during such an operation as the pitch of threads 16 and 17 is the same.

After the blades have been adjusted to equal but opposite angles of incidence so as to exert a lifting force when rotated in the direction of the arrows in Fig. 1. The angle of incidence of all of the blades may be increased or decreased to exert a greater or lesser upward force on the aircraft. This is done by rotating the handwheel 82 which operates cables 89 and 90 for the two main lifting units, and a foot lever 91 which operates cables 92 and 93 for the two rear units. Movement of cables 89, 90, 92 and 93 in the direction of the arrows b will raise both rods 14 and 15 and pull upon the rear of blades 6 and up on the front of blade 7. The pitch of blades 4 and 5 will also be similarly changed, the direction of the rotation and of the screw pitch being opposite from that on the left side of the aircraft.

If it is desired to stabilize the machine while flying as a helicopter, this is done by sidewise movement of joy stick 52 which decreases the pitch of the blades 4 and 5 and increases the pitch of blades 6 and 7 or vice versa. It will be seen that movement of the lever 52 to the left as shown in arrow *c*, Fig. 4, will rotate the sprockets 19 and 20 of the blades 4, 5, 6 and 7 as shown in arrows *c*, Fig. 3, to increase the pitch of the blades on the left side of the aircraft in order to right the machine.

When it is desired to operate as an airplane the lever 47 is operated, stopping the blades which are adjusted to their airplaning positions by operating the handwheels 74 and 82. The forward propeller 2 is thrown in pitch and the machine moves forward. While flying as an airplane the latch 68 is engaged with notches 67 and latch 65 is disengaged. When it is desired to stabilize for lateral unbalance the joy stick 52 is moved laterally which increases the angle of incidence of the outside blade only on one side, while decreasing the angle of the outside blade on the other side of the aircraft, the sprockets 19 of the front units being the only sprockets so operated. For tilting the machine up or down the stick 52 is moved forwardly or rearwardly which tilts both outside blades 4′ and 7′ at the rear of the machine in the same direction in the same manner as the operation of a horizontal rudder. During such fore and aft operation of stick 52 the latch 65 remains engaged with notches 64 and 61 as shown in Fig. 5.

It will be understood that the principle of my invention may be applied to airplanes or multiplanes, or that only one propeller may be used in the rear of the craft for controlling the angle of flight. I therefore do not wish to be limited to the precise details of the construction set forth, but desire to avail myself of such variations and modifications as come within the appended claims.

I claim:—

1. In a flying machine in combination, two aerofoils at each side of the forward portion of the machine, two aerofoils at each side of the rear part of the machine, means for rotating all of said aerofoils about approximately vertical axes, means for stopping all of said aerofoils at predetermined positions, means for adjusting the angle of incidence of said aerofoils so that they all have equal positive angles of incidence for functioning as stationary lifting planes or so that some of the aerofoils may have a reverse angle of incidence for acting as lifting propellers, said last mentioned means including mechanism for simultaneously changing the angle of incidence of one front aerofoil at each side of the machine for lateral stability while the remaining front aerofoils remain fixed.

2. In a heavier than air flying machine, a fuselage, a tractor propeller supported by the fuselage, an outrigger at each side of the forward portion of the fuselage, a main lifting propeller supported by each outrigger, a smaller outrigger at each side of the rear of the fuselage, an auxiliary lifting propeller supported by each smaller outrigger, means for stopping all of said lifting propellers, a hand operated device for reversing half the number of blades of each lifting propeller and simultaneously adjusting the remaining blades of the lifting propeller so that all the said blades are set at a positive angle of incidence to forward flight when said propellers are not rotating.

3. In a flying machine, a fuselage, a tractor propeller supported by the fuselage, an outrigger at each side of the fuselage, a main lifting propeller supported by each outrigger, an auxiliary lifting propeller at each side of the fuselage, means for rotating said lifting propellers, means for stopping and locking all of said lifting propellers at predetermined positions, means operable while the lifting propellers are stopped to simultaneously actuate the outside blades of the front lifting propellers in opposite directions for lateral stability, said means being operable to also actuate the outer blades of the rear propellers in the same direction for vertical steering.

4. In a combination helicopter and airplane, a plurality of rotatable lifting aerofoils, located normally one at each side of the longitudinal axis of the airplane, tractor means, means for changing said lifting aerofoils to stationary planing aerofoils, a lever operative when said aerofoils are acting as stationary planing aerofoils to effect lateral stability by reversely tilting one of said stationary aerofoils on each side of the longitudinal axis of the airplane and additional means for simultaneously varying the pitch of all said aerofoils.

In testimoy whereof I affix my signature.

THURMAN H. BANE.